(No Model.)
P. J. STOCKINGER.
BALE AND BOX HOOK.
No. 338,885. Patented Mar. 30, 1886.
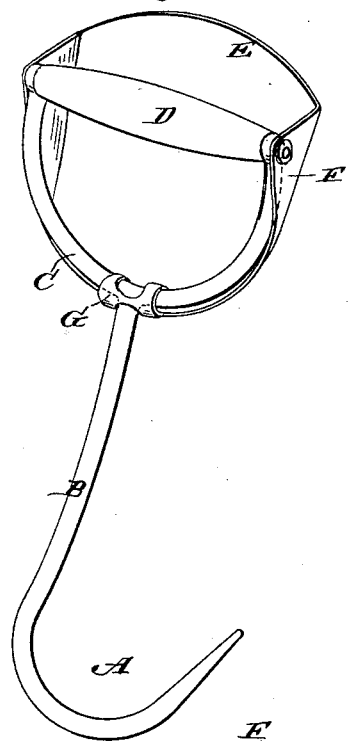
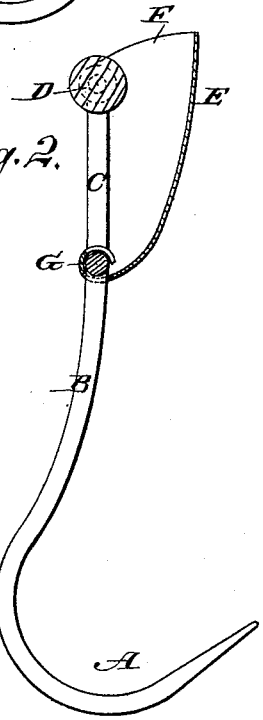
WITNESSES:
INVENTOR:
P. J. Stockinger
BY Munn & Co
ATTORNEYS.

UNITED STATES PATENT OFFICE.

PHILIP J. STOCKINGER, OF SAN JOSÉ, CALIFORNIA.

BALE AND BOX HOOK.

SPECIFICATION forming part of Letters Patent No. 338,885, dated March 30, 1886.

Application filed October 6, 1885. Serial No. 179,164. (No model.)

*To all whom it may concern:*

Be it known that I, PHILIP J. STOCKINGER, of San José, in the county of Santa Clara and State of California, have invented a new and Improved Bale and Box Hook, of which the following is a full, clear, and exact description.

The invention relates to certain new and useful improvements in the construction of a hook such as is generally used in handling boxes, bales, &c.

The object of my invention is to provide a new and improved bale and box hook, which is so constructed that the shank of the hook cannot turn in the hand and chafe the fingers of the person using it.

The invention consists in the construction and combination of parts and details, as will be fully described and set forth hereinafter, and then pointed out particularly in the claim.

Reference is to be had to the accompanying drawings, forming a part of this specification, in which similar letters of reference indicate corresponding parts in both the figures.

Figure 1 is a perspective view of my improved bale and box hook. Fig. 2 is a side view of the same, parts being in section.

The hook A is formed on the end of a shank, B, on the upper end of which a fork or crotch, C, is formed, and in the ends of the prongs of said fork a handle, D, is held, through which a pin or rivet is passed longitudinally; or pins or rivets can be driven through the two eyes in the ends of the shanks into the ends of the handle.

In the hooks used heretofore the shank was fastened in the handle by being passed transversely through it and then riveted, and it frequently happened that the shank loosened and turned in the handle. A further objection to such hooks is, that the shank is passed between the fingers and is very apt to chafe them. With my improved hook the fingers are passed through the opening formed by the handle and the prongs of the fork, and the shank of the hook need not be passed between the fingers. The turning of the hook between the fingers is thus prevented.

To prevent the chafing of the outer sides of the fingers by their coming in contact with the boxes, bales, bale-ties, &c., I provide a sheet-metal guard, E, having two side wings, F, which are held to the ends of the handle B by the rivets passed through said wings, the prongs C, and the ends of the handle; or said wings can be connected with the ends of the handle in any other suitable manner. In the lower central part of the guard E an aperture is formed, through which the shank B is passed, and the edge of the guard is punched out to form prongs G, which are bent over the lower central part of the crotch or fork C, whereby the guard is held securely on the handle of the fork. If desired, guards E can also be secured on bale-hooks of other constructions.

Having thus fully described my invention, I claim as new and desire to secure by Letters Patent—

The combination, with a bale-hook having a fork, C, formed on the upper end of its shank, and a handle, D, between the prongs of the fork, of the guard E, having wings F held on the ends of the handle, and the prongs G, bent over the middle portion of the fork, substantially as herein shown and described.

PHILIP J. STOCKINGER.

Witnesses:
 GEO. S. VOGLE,
 M. J. ASHMORE.